US006308111B1

(12) United States Patent
Koga

(10) Patent No.: US 6,308,111 B1
(45) Date of Patent: Oct. 23, 2001

(54) INFORMATION COLLECTING SYSTEM

(75) Inventor: Takahiro Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,237

(22) Filed: Dec. 4, 1998

(30) Foreign Application Priority Data

Dec. 5, 1997 (JP) .................................................. 9-335517

(51) Int. Cl.[7] ...................................................... G06F 17/00

(52) U.S. Cl. .................... 700/236; 700/241; 340/825.06; 340/825.35

(58) Field of Search ..................................... 700/231, 236, 700/241, 244; 340/825.06, 825.02, 825.35; 455/406, 407, 408, 449

(56) References Cited

U.S. PATENT DOCUMENTS 3,693,155 * 9/1972 Crafton et al. ................... 340/147 R
5,721,914 * 2/1998 DeVries ............................... 395/615
5,815,807 * 9/1998 Osmani et al. ...................... 455/410
5,842,976 * 12/1998 Williamson .......................... 600/300
5,930,771 * 7/1999 Stapp ..................................... 705/28
5,953,651 * 9/1999 Lu et al. .............................. 455/408
5,963,146 * 10/1999 Johnson et al. ................. 340/870.01
5,963,452 * 10/1999 Etoh et al. ...................... 364/479.06

FOREIGN PATENT DOCUMENTS 5-95586 4/1993 (JP) .
6-152773 5/1994 (JP) .
7-320127 12/1995 (JP) .
8-36670 2/1996 (JP) .
8-154135 6/1996 (JP) .
8-163262 6/1996 (JP) .
9-261151 10/1997 (JP) .
10-326376 12/1998 (JP) .
11-122158 4/1999 (JP) .

* cited by examiner

*Primary Examiner*—Christopher P. Ellis
*Assistant Examiner*—Khoi H. Tran
(74) *Attorney, Agent, or Firm*—Foley & Lardner

(57) ABSTRACT

An information collecting system includes a central management computer for collecting and managing information and information collection target machines from which information is to be collected and has a PHS terminal apparatus. Some of the target machines are master units to which outside line telephone numbers and extension telephone numbers are assigned. Each master unit can perform outside line radio communication with the PHS base station and extension radio communication with other target machines belonging to the master unit. The remaining target machines are subsidiary units to which extension telephone numbers are assigned. Each subsidiary unit can perform extension radio communication with only a specific master unit. Pieces of information stored in subsidiary units belonging to the specific master unit are sequentially stored in a subsidiary unit on an upper layer by extension radio communication, together with pieces of identification information identifying the subsidiary units from which the pieces of information are sent. The pieces of information are finally stored in the specific master unit and collected by the central management computer through a PHS base station and a telephone line by outside line radio communication.

6 Claims, 6 Drawing Sheets

INFORMATION COLLECTING SYSTEM

BACKGROUND OF THE INVENTION

1. Field of the Invention

The present invention relates to an information collecting system for an unattended merchandise selling machine/service providing machine such as a vending machine, which can wait on customers without human intervention in selling merchandise and providing services.

2. Description of the Prior Art

Recently, merchandise selling machines/service providing machines that can wait on customers without human intervention, including, for example, card issuing machines and unattended repair reception machines for shoes and the like, as well as vending machines, have been widely used. It is important for vending machines and automatic service providing machines that wait on customers without human intervention to collect customer service data and machine abnormality occurrence data for replenishment of merchandise, sales management, measures against machine failures, and the like.

Consider vending machines hereinafter. To determine the number of goods to be delivered to each vending machine and a delivery route thereto, perform sales management, and determine measures against a faulty machine, information must be periodically collected from each vending machine. It takes much labor and time to manually perform this information collection. For this reason, for example, a telephone line may be connected to a vending machine or a specific low-power radio unit may be installed to perform telephone line connection at a remote place, thereby allowing information collection using the telephone line. Alternatively, information collection may be performed by using dedicated radio services using tele-terminals, MCA radio units, and the like. With this operation, information can be collected without human intervention. In these methods, however, it takes much labor and high cost to lay telephone lines to vending machines, or high initial costs or running costs are required for the machines.

Under the circumstances, an information collecting apparatus for a vending machine is disclosed in Japanese Unexamined Patent Publication No. 8-154135, which uses a PHS (Personal Handyphone System) that covers a narrow area but is designed for personal use at low cost. The information collecting apparatus for the vending machine disclosed in Japanese Unexamined Patent Publication No. 8-154135 will be described below with reference to FIGS. 1 to 4.

FIG. 4 is a block diagram showing the schematic arrangement of a vending machine 109 used for this information collecting system. As shown in FIG. 4, the vending machine 109 includes a selling apparatus 112 and a coin processing apparatus 113, and forms an automatic merchandise selling mechanism. The selling apparatus 112 and the coin processing apparatus 113 are connected to a central processing unit (CPU) 110 through an interface 111. The central processing unit 110 controls the operations of the selling apparatus 112 and the coin processing apparatus 113 in accordance with programs. In addition, a ROM 114 storing operation programs, a RAM 115, and an information communication apparatus 116 are connected to the central processing unit 110 through a bus line 117. The RAM 115 has a transmission data storage section 115*a* for storing transmission data such as sales data, out-of-stock information, failure information, and abnormality information. The central processing unit 110 totalizes sales in the vending machine 109 and stores the resultant data in the transmission data storage section 115*a* every time a sale is made, or stores out-of-stock information, failure information, or the like in the transmission data storage section 115*a* upon detection of a corresponding state.

FIG. 2 is a block diagram showing the schematic arrangement of a PHS terminal apparatus 101 mounted in the vending machine 109. As shown in FIG. 2, the PHS terminal apparatus 101 includes a control section 102 having a CPU 102*a*, a ROM 102*b*, and a RAM 102*c*, a radio section 103, a vending machine interface 104, a speech codec 105, and a speech band modem 106. The vending machine interface 104 is connected to the control section 102 to allow communication with the information communication apparatus 116 (see FIG. 1) of the vending machine 109, and is designed to receive transmission data such as sales data, out-of-stock information, failure information, and abnormality information from the vending machine 109. Upon reception of transmission data from the vending machine 109 through the vending machine interface 104, the control section 102 performs control to convert the data into speech data through the speech band modem 106, convert this modem signal into a signal that can be transmitted by the PHS through the speech codec 105, and perform radio data transmission through the radio section 103.

FIG. 3 shows an information collecting system for a vending machine, which implements a combination of PHS transmission and telephone line transmission by using the vending machine 109 and the PHS terminal apparatus 101 shown in FIGS. 1 and 2. The PHS terminal apparatus 101 mounted in the vending machine 109 transmits/receives data to/from a PHS base station 107. The PHS base station 107 transmits/receives data to/from a center 120 through a telephone line 118. In this case, the PHS base station 107 can use a center originating scheme in which the center 120 collects sales data from the vending machine 109 at the fixed time and a terminal originating scheme in which failure information, out-of-stock information, or abnormality information is transmitted from the vending machine 109 to the center 120 in real time. In the center originating scheme, by collecting sales data and failure information at the fixed time at night, the number of goods to be delivered to each vending machine, a delivery route thereto, and a measure against a faulty machine on the next day can be determined. In the terminal originating scheme, since transmission can be performed upon occurrence of a failure or abnormality, the failure or abnormality can be instantly handled, thereby shortening the time during which sales cannot be performed.

FIG. 4 shows an information collecting system for a vending machine, which uses the vending machine 109 and the PHS terminal apparatus 101 in FIGS. 1 and 2, but does not use any telephone line. The PHS terminal apparatus 101 transmits/receives data to/from a portable PHS terminal apparatus 121. The portable PHS terminal apparatus 121 has the same arrangement as that of the PHS terminal apparatus 101 shown in FIG. 1, and includes a control section 102, a radio section 103, a speech codec 105, and a speech band modem 106. The portable PHS terminal apparatus 121 can transmit/receive data to/from the PHS terminal apparatus 101 within its transmission/reception area. The manager of the vending machines 109 can therefore collect data from all the vending machines 109 within the transmission/reception area without approaching any vending machines 109. When the radio section 103 receives a data signal from the vending machine 109 through the PHS terminal apparatus 101, the portable PHS terminal apparatus 121 stores the signal data in the memory (RAM 102*c*) of the control section 102.

A concrete example of an information collecting system using the portable PHS terminal apparatus 121 will be described below. The manager of the vending machine 109 may collect data from the PHS terminal apparatus 101 mounted in the vending machine 109 into the portable PHS terminal apparatus 121 while driving a merchandise delivery car 122, and may unload and deliver necessary goods from the merchandise delivery car 122 to the vending machine 109 on the basis of the collected data. In this case, the portable PHS terminal apparatus 121 preferably has the function of processing various types of information stored in the memory of the control section 102 and displaying the resultant data on a display unit or printing the data by a printer.

As described above, in the information collecting system disclosed in Japanese Unexamined Patent Publication No. 8-154135, data can be collected from each vending machine without directly connecting a telephone line to the vending machine, and telephone line connection is facilitated by using a PHS. In addition, even if no PHS base station is not present near a vending machine, data can be collected from the vending machine.

The following problems, however, arise in the information collecting system disclosed in Japanese Unexamined Patent Publication No. 8-154135.

First, this information collecting system requires a high running cost. This is because, in the information collecting system, the PHS terminal apparatuses mounted in all the vending machines must be registered in a telephone office, and a large amount of basic charge must be paid to the telephone office as a whole.

Second, in this information system, vending machines from which information is to be collected must be installed in limited places. This is because, information is directly communicated between each vending machine from which information is to be collected and the center through an outside line, and hence each vending machine must be installed within the outside line communication area.

Third, in this information system, the manager cannot directly collect information from a vending machine from which information is to be collected unless he/she is located in an area near the vending machine. This is because, in the information system, the vending machine cannot directly communicate information with the information collecting terminal apparatus outside the extension communication area of the vending machine.

SUMMARY OF THE INVENTION

The present invention has been made in consideration of the above situation in the prior art, and has as its object to provide an information collecting system which has few restrictions on places where machines from which information is to be collected are installed, and can be maintained at a low communication running cost.

In order to achieve the above object, according to the principal aspect of the present invention, there is provided an information collecting system comprising a central management computer for collecting and managing information through a PHS base station and a telephone line, and a plurality of information collection target machines serving as target machines from which information is collected by the central management computer and has a PHS terminal apparatus, wherein some of the plurality of target machines are master units to which outside line telephone numbers and extension telephone numbers are assigned, and each of the master units can perform outside line radio communication with the PHS base station and extension radio communication with other target machines belonging to the master unit, the remaining target machines are subsidiary units to which extension telephone numbers are respectively assigned, and each of the subsidiary units can perform extension radio communication with only a specific master unit, and pieces of information stored in subsidiary units belonging to the specific master unit are sequentially stored from the subsidiary units on a lower layer to a subsidiary unit on an upper layer by extension radio communication, together with pieces of identification information identifying the subsidiary units from which the pieces of information are sent, the pieces of information being finally stored in the specific master unit and collected by the central management computer through the PHS base station and the telephone line by outside line radio communication.

With this arrangement, all the PHS terminal apparatuses of installed target machines need not be registered in a telephone office, but only master units may be registered, so a large amount of basic charge need not be paid, thus suppressing the communication running cost.

Note that the above subsidiary units include both first and second subsidiary units to be described in detail in "DETAILED DESCRIPTION OF PREFERRED EMBODIMENT". First and second subsidiary units basically have the same arrangement and function and are termed differently only for the sake of descriptive convenience.

The information collecting system of the present invention can be effectively applied to vending machines that are installed in large quantities at relatively small intervals outdoors, in buildings, and the like.

In the information collecting system according to the principal aspect, the extension telephone numbers assigned to the respective target machines are preferably used as pieces of identification information for identifying the target machines from which the pieces of information are transmitted, because data management is facilitated when, for example, a subsidiary unit is to be added or omitted, or a subsidiary unit and a master unit are to be interchanged.

In the information collecting system according to the principal aspect, each of the target machines comprises a control section for controlling operation of the target machine, a transmission information storage section for storing information to be transmitted to the central management computer, an identification information storage section for storing the identification information, a host unit extension telephone number storage section for storing an extension telephone number of a host unit as the target machine to which information is to be transmitted, an automatic extension communication time data storage section for storing time data based on which the information is to be transmitted to the host unit, a timer for managing time, and an extension/outside line switching data storage section for storing information for switching a radio communication method used by the PHS terminal apparatus to an extension mode or outside line mode; in the subsidiary unit, the extension/outside line switching data in the extension/outside line switching data storage section is set in the extension mode in advance, and control is performed by the control section to periodically transmit the information stored in the transmission information storage section and the identification information to the host unit in accordance with the extension telephone number stored in the host unit extension telephone number storage section on the basis of the timer and the automatic extension communication time data stored in the automatic extension communication time data storage section; and in the master unit, the extension/outside line switching data in the extension/outside line switching data storage section is set in the extension mode in advance, and the extension/outside line switching data in the extension/outside line switching data storage section is switched to the outside line mode by the control section when the control section determines, on the basis of pieces of transmitted identification information, that all pieces of information to be transmitted to the master unit have been transmitted, thereby transmitting all pieces of information including information about the master unit to the central management computer through the PHS base station and the telephone line.

With this arrangement of each target machine, the central management computer can efficiently collect information from each target machine.

The information to be transmitted from each vending machine to the central management computer is preferably sales information including sales amount data, stock state information of goods, failure information, and remaining change information.

In the above information collecting system, the area in which target machines are to be installed can be expanded by installing subsidiary units such that the extension communication areas of the respective subsidiary units are linked to each other, thereby reducing restrictions on places where target machines are to be installed.

The information collecting system of the present invention has the following functions and effects.

(1) According to the present invention, an information collecting system that can be maintained at a low communication running cost can be constructed for the following reason. Outside line telephone numbers are not assigned to all install target machines, e.g., the PHS terminal apparatuses of all vending machines but are assigned to only specific vending machines (master units in the embodiment). In addition, the center performs outside line radio communication with only the master units to collect pieces of information from other vending machines through a telephone line.

(2) According to the present invention, the installation area of a target machine, e.g., a vending machine, need not be set within the outside line communication area of the PHS terminal apparatus of the vending machine (i.e., the area in which communication with the PHS base station can be performed). This increases the degree of freedom in terms of the installation place for each vending machine for the following reasons. In the present invention, since vending machines other than master units can communicate information with each other by extension radio communication, the vending machines that perform extension radio communication need not be installed in an outside line communication area. In addition, by linking extension radio communication areas to each other, the installation area of vending machines, which covers the information collecting system, can be expanded.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENT

A preferred embodiment of the present invention will be described below with reference to the accompanying drawings.

Figure 5:
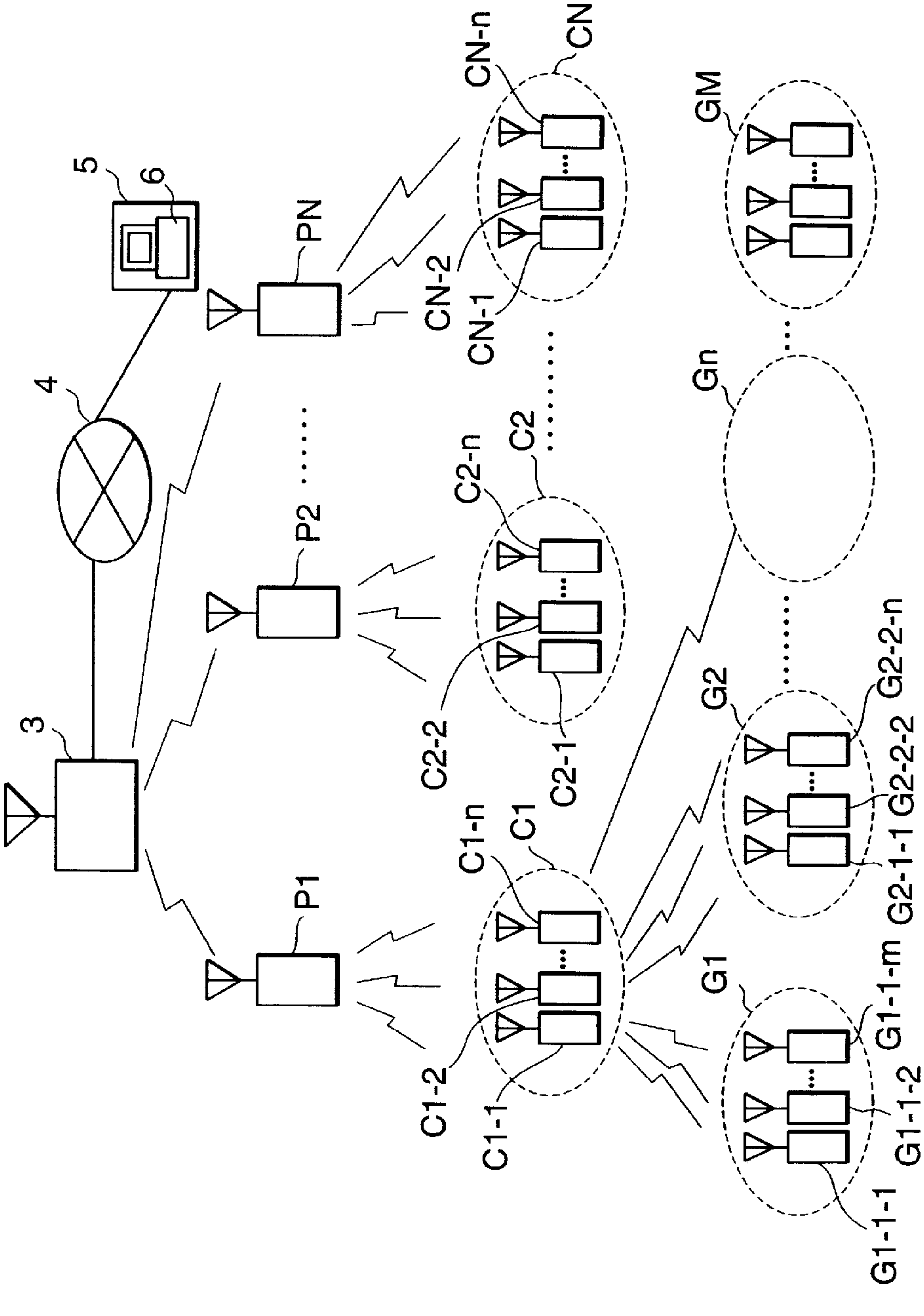
FIG. 5 is a block diagram showing the schematic arrangement of an information collecting system according to an embodiment of the present invention.

FIG. 5 shows the schematic arrangement of an information collecting system according to an embodiment of the present invention.

The information collecting system of the present invention is constituted by a central management computer in the center, which collects and manages information, and unattended merchandise selling machines/service providing machines for transmitting information to the central management computer through PHS base stations and telephone lines (i.e., information collection targets for the central management computer). In this embodiment, the information collection targets are vending machines.

Referring to FIG. 5, each of N (N is a natural number) vending machines P1 to PN has a PHS terminal apparatus 20 (see FIG. 6), to which an outside line telephone number is assigned to perform outside line radio communication with a PHS base station 3. Each vending machine that can perform outside line radio communication with the PHS base station 3 will be referred to as a master unit hereinafter. Information on each vending machine is collected by a central management computer 6 in a center 5. Each master unit can transmit information to the central management computer 6 through the PHS base station 3 and a telephone line 4.

Figure 6:
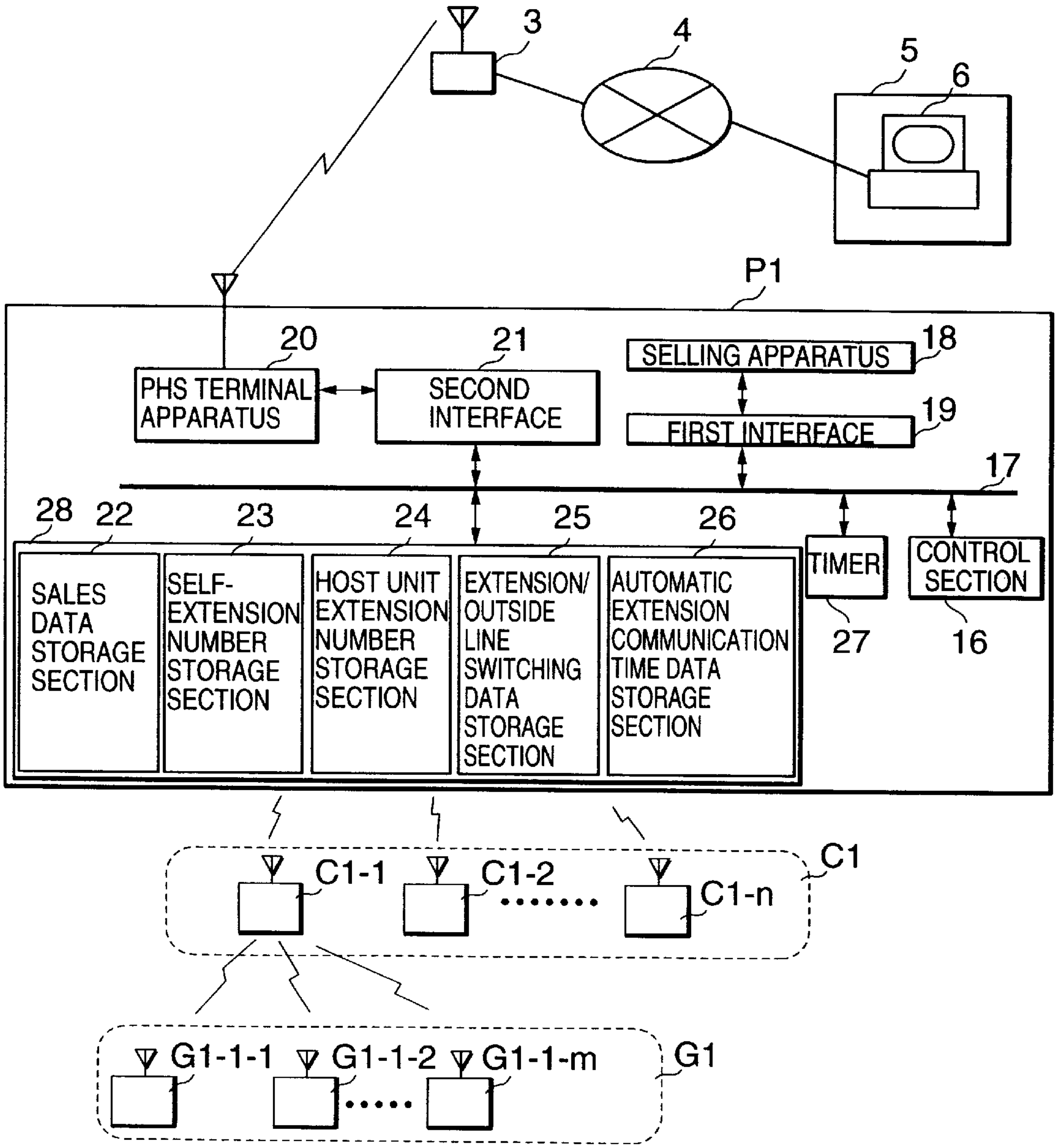
FIG. 6 is a block diagram showing the schematic arrangement of a vending machine of the information collecting system according to the embodiment.

Each of master units P1 to PN can perform only extension radio communication with one or a plurality of vending machines each having the second interface 20 (see FIG. 6). Each vending machine that can directly perform extension radio communication with a specific master unit will be referred to as a first subsidiary unit hereinafter. In this case, each first subsidiary unit performs extension radio communication with only a specific master unit, but does not perform radio communication with other master units. When, therefore, first subsidiary units for performing extension radio communication with master units are arranged and displayed on the lower layer with respect to the corresponding master units, as shown in FIG. 5, N first subsidiary unit groups C1 to CN are arranged on the lower layer with respect to the master units P1 to PN in such a manner that the first subsidiary unit group Cl constituted by n first subsidiary units C1-1, C1-2, . . . , C1-n (n is an arbitrary natural number) is located on the lower layer with respect to the master unit P1, and the first subsidiary unit group C2 constituted by n first subsidiary units C2-1, C2-2, . . . , C2-n is located on the lower layer with respect to the master unit C2. In this case, although the numbers of first subsidiary units constituting the respective first subsidiary unit groups are denoted by the same reference symbol "n", the respective first subsidiary unit groups may be constituted by different numbers of first subsidiary units.

One or each of a plurality of first subsidiary units, each belonging to a specific first subsidiary unit group and having the second interface 20, can perform extension radio communication with one or a plurality of specific subsidiary units. Each vending machine that can directly perform extension radio communication with a specific first subsidiary unit will be referred to as a second subsidiary unit hereinafter. In this case, each second subsidiary unit performs extension radio communication with only a specific first subsidiary unit, but does not perform radio communication with other first subsidiary units. When, therefore, second subsidiary units for performing extension radio communication with first subsidiary units are arranged and displayed on the lower layer with respect to the first subsidiary units, as shown in FIG. 5, M (M is an arbitrary natural number) second subsidiary unit groups G1 to GM are arranged on the lower layer with respect to the respective first subsidiary units belonging to the first subsidiary groups C1 to CN in such a manner that the second subsidiary unit group G1 constituted by second subsidiary units G1-1-1, G1-1-2, . . . , G1-1-m (m is an arbitrary natural number) is located on the lower layer with respect to the first subsidiary unit C1-1, and the second subsidiary unit group G2 constituted by m second subsidiary units G2-1-1, G2-1-2, . . . , G2-1-m is located on the lower layer with respect to the first subsidiary unit C1-2. In this case, although the numbers of second subsidiary units constituting the respective second subsidiary unit groups are denoted by the same reference symbol "m", the respective second subsidiary unit groups may be constituted by different numbers of second subsidiary units.

As described above, the information collecting system of this embodiment includes one or a plurality of master units P1 to PN, the PHS base station 3 for performing outside line radio communication with the respective master units P1 to PN, the central management computer 6 in the center 5 which performs information communication with the PHS base station 3 through the telephone line 4, the first subsidiary groups C1 to CN, each constituted by one or a plurality of subsidiary units, which are arranged on the lower layer with respect to the master units P1 to PN and can perform extension radio communication with the respective master units P1 to PN, and second subsidiary groups G1 to GM, each constituted by one or a plurality of second subsidiary units, which are arranged on the lower layer with respect to the first subsidiary groups C1 to CN and can perform extension radio communication with the respective first subsidiary units belonging to the first subsidiary groups C1 to CN. Although outside line telephone numbers are respectively assigned to the master units P1 to PN, outside line telephone numbers need not be assigned to the first and second subsidiary units because they perform only extension radio communication.

The arrangement of each of the vending machines constituting this embodiment will be described next with reference to FIG. 6 by taking the master unit P1 as an example. The master unit P1 includes a control section 16 for controlling the overall operation of the master unit P1, a bus 17 serving as an internal local bus, a selling apparatus 18 forming a vending machine for automatically selling goods in accordance with the amounts of money inserted, a first interface 19 serving as an interface between the selling apparatus 18 and the bus 17, the PHS terminal apparatus 20 for transmitting vending machine information to the PHS base station 3 by extension or outside line radio communication, a second interface 21 serving as an interface between the PHS terminal apparatus 20 and the bus 17, an information communication data storage section 28 for storing data to be communicated by radio, and a timer 27.

Figure 1:
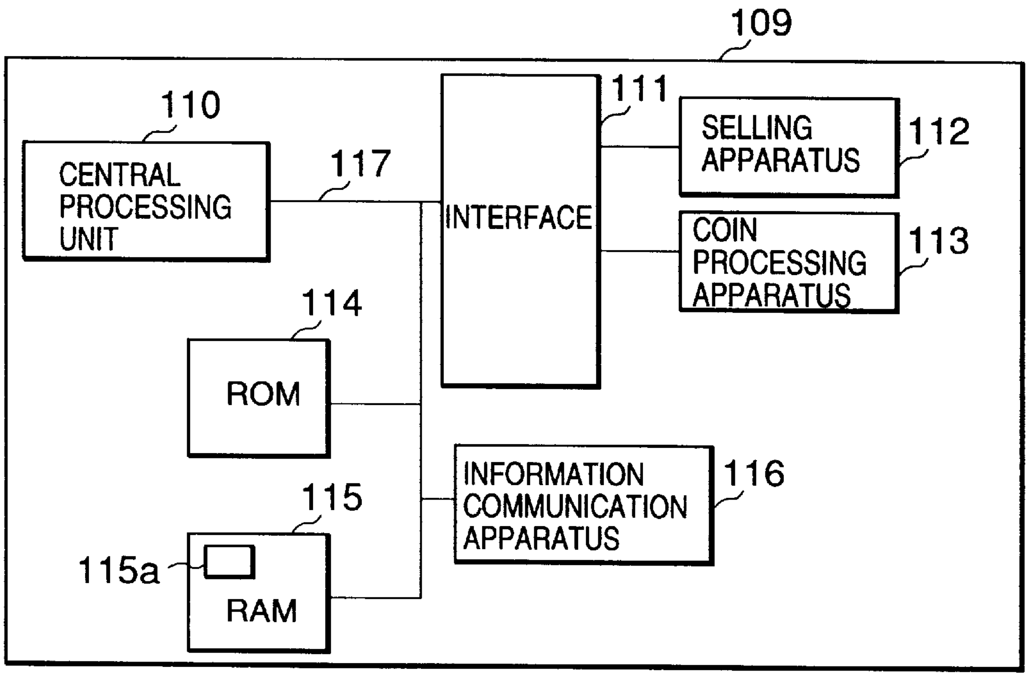
FIG. 1 PRIOR ART
FIG. 1 is a block diagram showing the schematic arrangement of an information system using no telephone line disclosed in Japanese Unexamined Patent Publication No. 8-154135.
Figure 2:
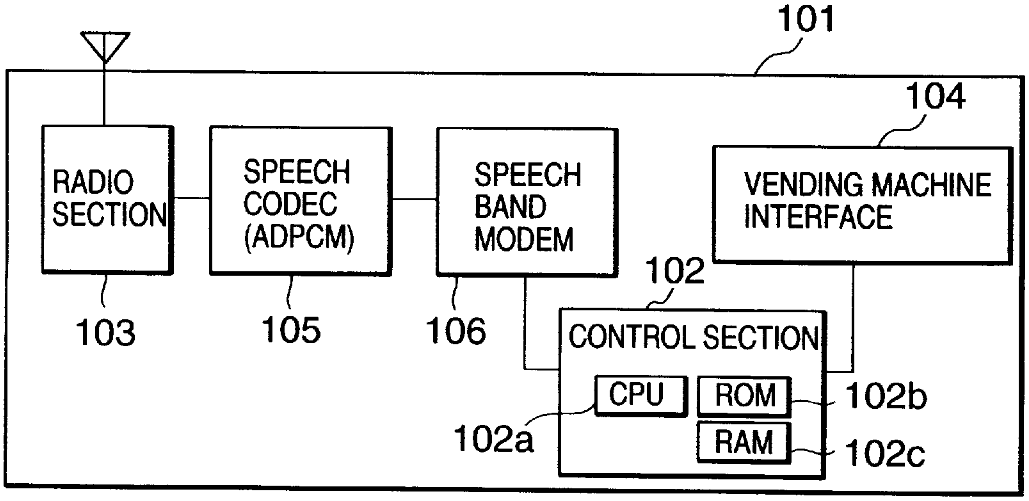
FIG. 2 PRIOR ART
FIG. 2 is a block diagram showing the schematic arrangement of a PHS terminal apparatus mounted in the vending machine shown in FIG. 1.
Figure 3:
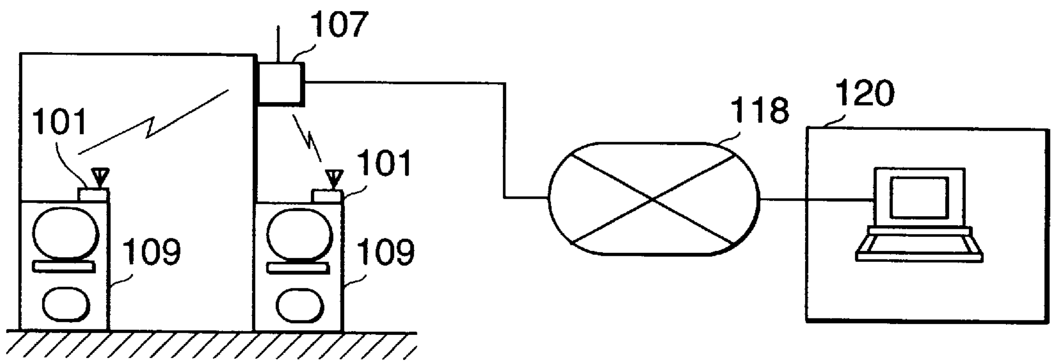
FIG. 3 PRIOR ART
FIG. 3 is a block diagram showing the schematic arrangement of the information system disclosed in Japanese Unexamined Patent Publication No. 8-154135.
Figure 4:
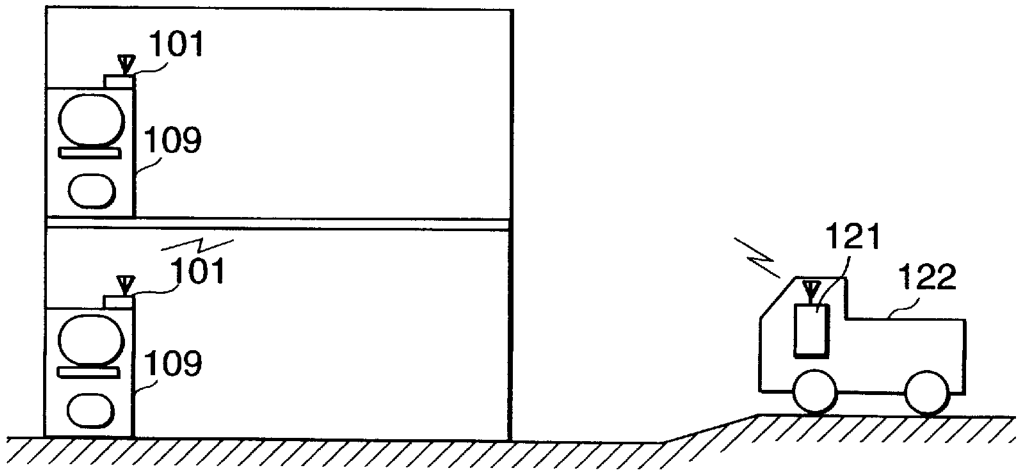
FIG. 4 PRIOR ART
FIG. 4 is a block diagram showing the schematic arrangement of the information system using no telephone line disclosed in Japanese Unexamined Patent Publication No. 8-154135.

Since the internal arrangement of the PHS terminal apparatus 20 may be identical to that shown in FIG. 2, a detailed description thereof will be omitted.

In this case, the information communication data storage section 28 includes a sales data storage section 22 for storing various data associated with sales information, e.g., the sales amount in the selling apparatus 18, the stock state of goods, a failure state, and remaining change, a self-extension number storage section 23 for storing the self-extension number of the PHS terminal apparatus 20, a host unit extension number storage section 24 for storing the extension number of a vending machine corresponding to the upper layer for the self-machine, an extension/outside line switching data storage section 25 for storing information for switching the radio communication method for the PHS terminal apparatus 20 between the extension communication scheme and the outside line communication scheme, and an automatic extension communication time data storage section 26 for storing time data based on which information communication is automatically performed with the vending machine having the host unit extension number stored in the host unit extension number storage section 24 by extension communication.

Note that each vending machine belonging to the remaining-master units P2 to PN, the first subsidiary groups C1 to CN, and the second subsidiary groups G1 to GM basically has the same arrangement as that of the master unit P1 in FIG. 2.

An information collecting method in the information collection system according to the embodiment of the present invention will be described next with reference to FIGS. 5 to 7. In this case, the first subsidiary unit group C1 arranged on the lower layer with respect to the master unit P1 and the second subsidiary unit group G1 arranged on the ower layer with respect to the first subsidiary unit C1-1 belonging to the first subsidiary unit group C1 will be exemplified. Note that since the arrangement of each of first and second subsidiary units is the same as that of the master unit P1 in FIG. 6, the same reference numerals as those of the components of the master unit P1 will be used to explain the internal constituents of each of the first and second subsidiary units.

The contents of data stored in the information communication data storage section 28 incorporated in each of the second subsidiary units G1-1-1 to G1-1-m included in the second subsidiary unit group G1 will be described first. The extension switching data in the extension/outside line switching data storage section 25 is set in the mode of performing only extension communication. The self-extension number stored in the self-extension number storage section 23 is, for example, a 5-digit value unique to the self-machine. The host unit extension number stored in the host unit extension number storage section 24 is set to be the same value as the self-extension number of the first subsidiary unit C1-1 corresponding to its host unit. The sales data storage section 22 stores data associated with sales, e.g., the sales amount data, the stock state of goods, failure information, and remaining change information, which are sent from the selling apparatus 18 through the first interface 19. The automatic extension communication time data storage section 26 stores time data for causing the second subsidiary unit G1-1-1 to periodically perform radio information communication with the first subsidiary unit G1-1-1.

The control section 16 of the second subsidiary unit G1-1-1 performs control to periodically perform extension radio information communication with the first subsidiary unit C1-1 by performing extension communication using the extension number of the first subsidiary unit, which is stored in the host unit extension number storage section 24, at predetermined time based on the time data stored in the automatic extension communication time data storage section 26 in accordance with the extension communication mode set in the extension/outside line switching data storage section 25. At this time, the sales data stored in the sales data storage section 22 of the second subsidiary unit G1-1-1 is sent to the first subsidiary unit C1-1, together with the self-extension number stored in the self-extension number storage section 23. Likewise, the self-sales data is sent to the first subsidiary unit C1-1, together with the self-extension number of each of the remaining second subsidiary units G1-1-2 to G1-1-m belonging to the second subsidiary unit G1, in the extension mode. Upon reception of the sales data, the first subsidiary unit C1-1 stores the sales data transmitted from the second subsidiary units in the sales data storage section 22 of the self-apparatus such that the vending machines from which the sales data are transmitted can be specified on the basis of the extension numbers sent together with the sales data.

The extension numbers of the respective second subsidiary units and the sales data in the respective second subsidiary units, stored in the sales data storage section 22 of the first subsidiary unit C1-1, are transmitted to the master unit P1, together with the self-extension number and sales data of the first subsidiary unit C-1, by extension radio communication by the same method as that used to transmit the sales data from the above second subsidiary units to the first subsidiary unit. These data are then stored in the sales data storage section 22 of the master unit P1. Similarly, each of the first subsidiary units C1-2 to C1-n belonging to the first subsidiary unit group C1 transmits the sales data of each second subsidiary unit, including the each extension number, to the master unit P1, together with the self-extension number and self-sales data.

The sales data stored in the sales data storage section 22 of the master unit P1 contains the sales data received from the respective first subsidiary units C1-1 to C1-n belonging to the first subsidiary unit group C1 by extension communication and the self-sales data. When the control section 16 of the master unit P1 determines, on the basis of the extension numbers transmitted from the first subsidiary units, that all the sales data from the vending machines arranged on the lower layer with respect to the self-apparatus are stored in the sales data storage section 22 of the self-device, the control section 16 switches the PHS terminal apparatus 20 of the self-apparatus to the outside line communication mode by rewriting the data in the automatic extension communication time data storage section 26 of the self-apparatus to that in the outside line communication mode. With this operation, the PHS terminal apparatus 20 of the master unit P1 transmits its sales data to the central management computer 6 in the center 5 through the telephone line 4 by making an outside call to the PHS base station 3. After the transmission of the sales data is complete, the master unit P1 rewrites the data in the extension/outside line switching data storage section 25 again to switch the PHS terminal apparatus 20 to the extension communication mode. With the above operation, the central management computer 6 can manage the sales data transmitted from the master unit P1, i.e., the sales data unique to the master unit P1 and all the vending machines arranged on the lower layer with respect to the master unit P1.

Figure 7:
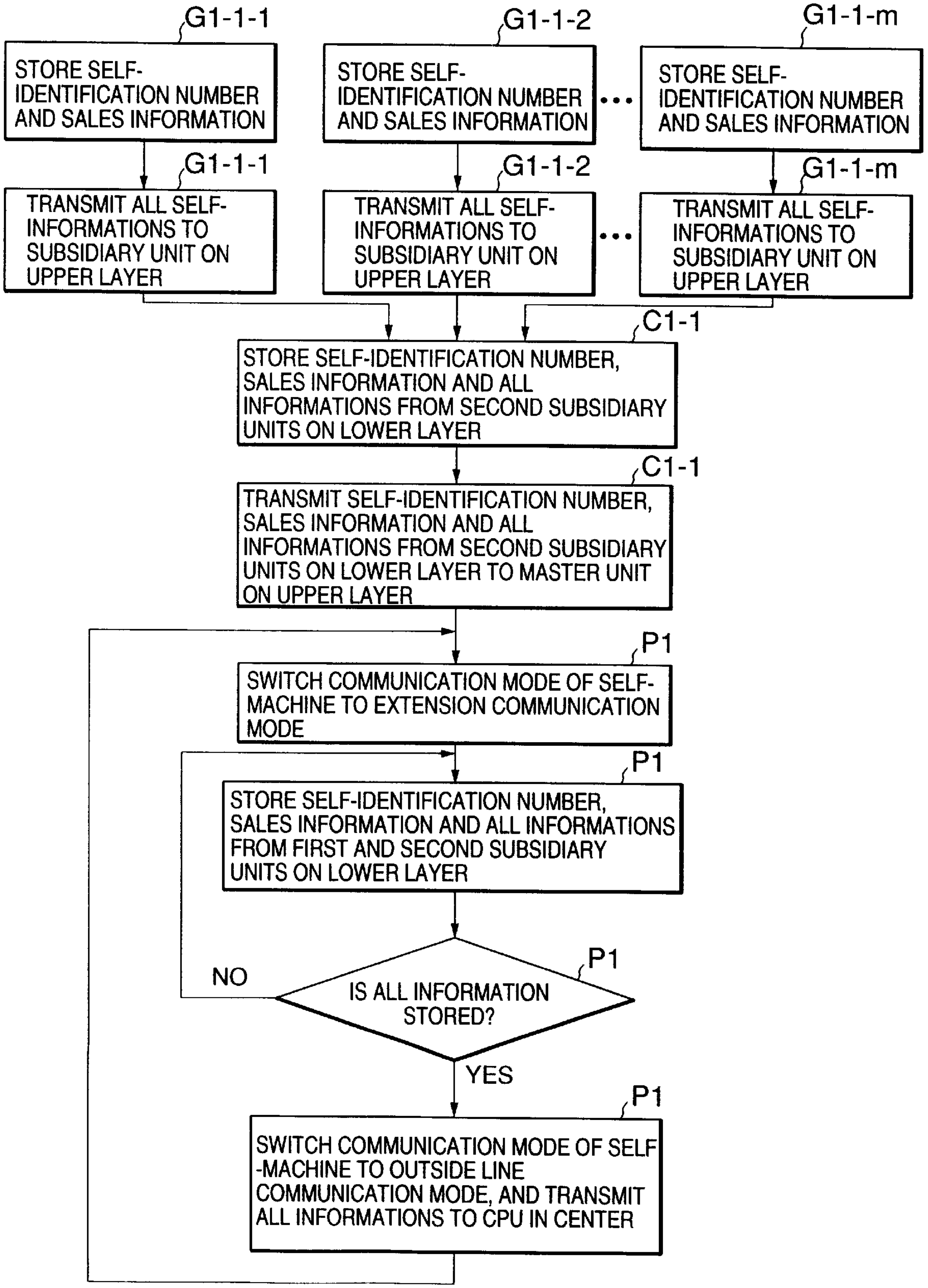
FIG. 7 is a flow chart showing an example of the operation of the information collecting system according to the embodiment.

FIG. 7 is a flow chart showing the above series of operations.

The operation of each of the remaining master units P2 to PN is the same as that of the master unit P1 described above. Assume that one of a plurality of master units is in the outside line communication mode, and the remaining master units are in the extension communication mode. In this case, when one outside line communication mode is shared, a plurality of master units can supply one outside line number.

By combining extension radio communication and outside line radio communication in the above manner, an information system with a low communication running cost can be constructed.

Figure 8:
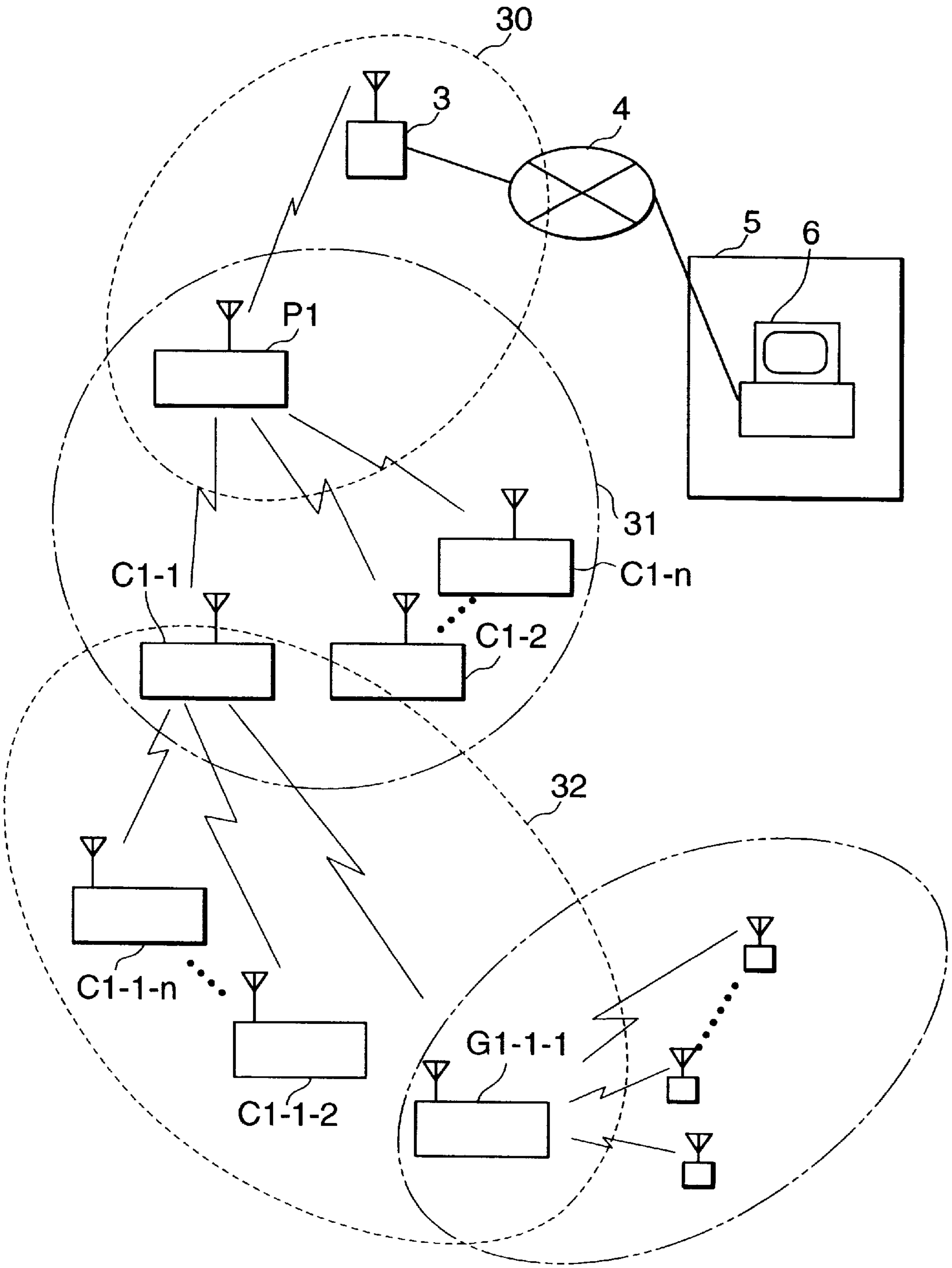
FIG. 8 is a block diagram schematically showing a method of installing vending machines constituting the information collecting system according to the embodiment.

In order to perform extension radio communication, vending machines (second and first subsidiary units or a first subsidiary unit and a master unit) that are to perform extension radio communication with each other must be located within the same extension communication area. Installation of these vending machines will be described with reference to FIG. 8. FIG. 8 shows the master unit P1, the first subsidiary unit group C1, the second subsidiary unit group G1, and the like. In this case, in an area 30, the master unit P1 can perform outside line radio communication with the PHS base station 3. In an area 31, the first subsidiary units belonging to the first subsidiary unit group C1 can perform extension radio communication with the master unit P1. In an area 32, the second subsidiary units belonging to the second subsidiary unit group GI can perform extension radio communication with the first subsidiary unit C1-1. In order to construct the information system of the present invention, the master unit P1 must always be installed in the area 30, the first subsidiary units belonging to the first subsidiary unit group G1 must always be installed in the area 31, and the second subsidiary units belonging to the second subsidiary unit group G1 must always be installed in the area 32.

As has been described above, although there is a restriction that each vending machine must be installed in an area in which the machine can perform extension radio communication with a host unit to which the machine directly transmit information, an extension radio communication network that requires no outside line radio communication and can be maintained at a low communication running cost can be expanded and constructed by sequentially linking areas in which extension radio communication can be performed.

In the above embodiment, the extension numbers of the respective vending machines are used as values for identifying the sales data from the respective vending machines. However, values unique to the respective vending machines may be set instead of the extension numbers. If the extension numbers are used as values for identifying the sales data from the respective vending machines, other values need not be set, and data management is facilitated when a first or second subsidiary unit is added or removed afterward, or a first subsidiary unit is interchanged with a master unit.

In this embodiment, the central management computer collects and manages information from vending machines. However, in addition to vending machines, the information collecting system of the present invention can be applied to various types of machines from which information is collected and managed by a central management computer, for example, card issuing machines and machines for issuing certificates and the like associated with administrative agencies.

What is claimed is:

1. An information collecting system comprising:

a central management computer for collecting and managing information through a personal handyphone system PHS base station and a telephone line; and a plurality of information collection target machines serving as target machines from which information is collected by said central management computer and has a PHS terminal apparatus, wherein some of said plurality of target machines are master units to which outside line telephone numbers and extension telephone numbers are assigned, and each of said master units can perform outside line radio communication with said PHS base station and extension radio communication with other target machines belonging to said master unit, said remaining target machines are subsidiary units to which extension telephone numbers are respectively assigned, and each of said subsidiary units can perform extension radio communication with only a specific master unit, and pieces of information stored in subsidiary units belonging to said specific master unit are sequentially stored from said subsidiary units on a lower layer to a subsidiary unit on an upper layer by extension radio communication, together with pieces of identification information identifying said subsidiary units from which the pieces of information are sent, the pieces of information being finally stored in said specific master unit and collected by said central management computer through said PHS base station and the telephone line by outside line radio communication.

2. A system according to claim 1, wherein said target machine is a vending machine.

3. A system according to claim 1, wherein the pieces of identification information identifying said subsidiary units from which the pieces of information are sent are extension telephone numbers assigned to said respective subsidiary units.

4. A system according to claim 1, wherein each of said target machines comprises a control section for controlling operation of said target machine, a transmission information storage section for storing information to be transmitted to said central management computer, an identification information storage section for storing the identification information, a host unit extension telephone number storage section for storing an extension telephone number of a host unit as said target machine to which information is to be transmitted, an automatic extension communication time data storage section for storing time data based on which the information is to be transmitted to said host unit, a timer for managing time, and an extension/outside line switching data storage section for storing information for switching a radio communication method used by said PHS terminal apparatus to an extension mode or outside line mode, in said subsidiary unit, the extension/outside line switching data in said extension/outside line switching data storage section is set in the extension mode in advance, and control is performed by said control section to periodically transmit the information stored in said transmission information storage section and the identification information to said host unit in accordance with the extension telephone number stored in said host unit extension telephone number storage section on the basis of said timer and the automatic extension communication time data stored in said automatic extension communication time data storage section, and in said master unit, the extension/outside line switching data in said extension/outside line switching data storage section is set in the extension mode in advance, and the extension/outside line switching data in said extension/outside line switching data storage section is switched to the outside line mode by said control section when said control section determines, on the basis of pieces of transmitted identification information, that all pieces of information to be transmitted to said master unit have been transmitted, thereby transmitting all pieces of information including information about said master unit to said central management computer through said PHS base station and the telephone line.

5. A system according to claim 2, wherein the pieces of information transmitted to said central management computer are pieces of sales information including sales amount data, stock state information about goods, failure information, and remaining change information.

6. A system according to claim 1, wherein a range in which said central management computer can collect information can be expanded by installing subsidiary units such that extension communication areas of said subsidiary units are linked to each other.

* * * * *